Jan. 8, 1924.

G. B. BOWELL 1,479,888

CINEMATOGRAPH MECHANISM

Filed Dec. 1, 1922   5 Sheets-Sheet 1

INVENTOR.
George Bennett Bowell.
by Arthur (...)
Attorney.

Jan. 8, 1924.　　　　　　　　　　　　　　　　1,479,888
G. B. BOWELL
CINEMATOGRAPH MECHANISM
Filed Dec. 1, 1922　　　5 Sheets-Sheet 2

INVENTOR.
George Bennett Bowell.
by Arthur Stephens
Attorney.

Jan. 8, 1924.   1,479,888
G. B. BOWELL
CINEMATOGRAPH MECHANISM
Filed Dec. 1, 1922   5 Sheets-Sheet 3

INVENTOR.
George Bennett Bowell.
by Arthur J. [illegible]
Attorney.

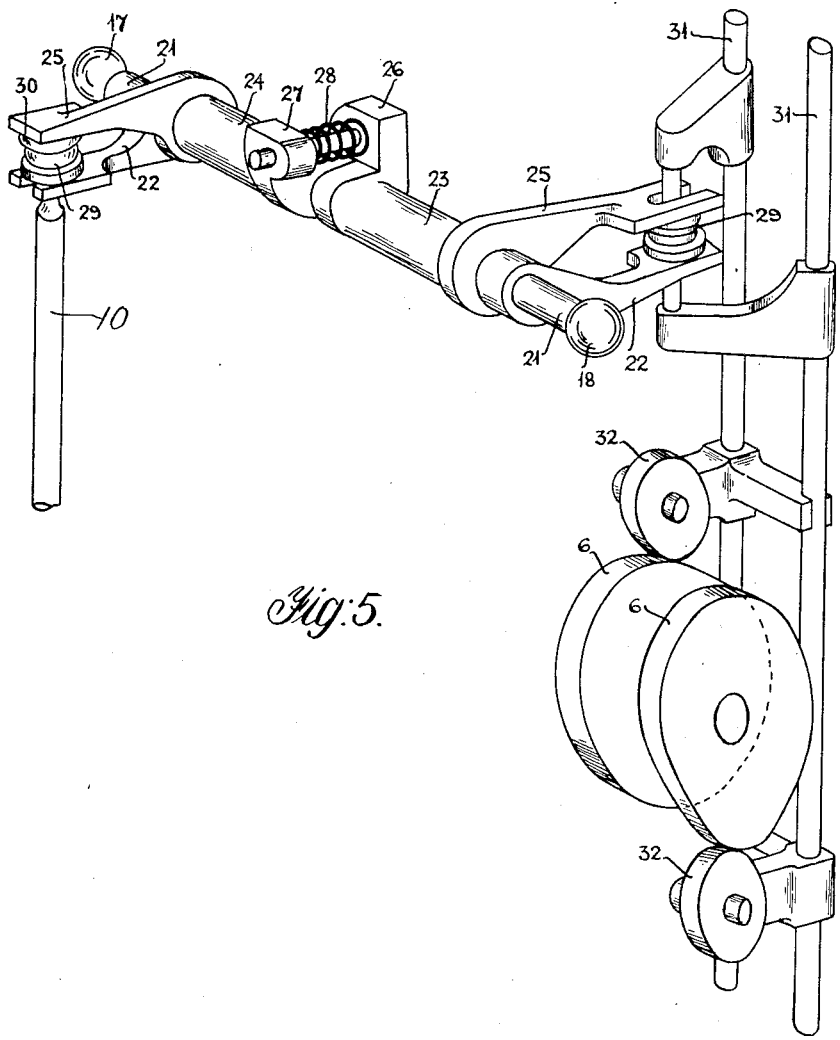

Patented Jan. 8, 1924.

1,479,888

UNITED STATES PATENT OFFICE.

GEORGE B. BOWELL, OF HIGH BARNET, ENGLAND, ASSIGNOR OF ONE-HALF TO GILBERT RICHARD REDGRAVE, OF LONDON, ENGLAND.

CINEMATOGRAPH MECHANISM.

Application filed December 1, 1922. Serial No. 604,343.

*To all whom it may concern:*

Be it known that I, GEORGE BENNETT BOWELL, a subject of the King of Great Britain and Ireland, residing at 20 Bedford Avenue, High Barnet, Hertfordshire, England, have invented new and useful Improvements in Cinematograph Mechanism (on which application has been made for Letters Patent in Great Britain, No. 34,438, filed 21st December, 1921, cognate with No. 26,847, dated 4th October, 1922), of which the following is a specification.

The present invention relates to improvements in cinematograph mechanism.

In cinematograph mechanism the time occupied in the transition from each picture to the next should be small otherwise flicker and light efficiency suffer, on the other hand it should be large else the film and the steadiness of projection suffer.

Where the film is normally held at rest between pressure devices and is intermittently drawn through the same by means of a maltese cross or other intermittent mechanism, the design of the whole is necessarily a compromise.

An attempt has been made to provide a fast period of transition from picture to picture but with the film drawn at picture changing speed through the gate, the mechanism having swinging frames or shuttles for operating the film whereby a more or less continuous progression of the film was obtained above and below the gate.

Briefly stated the object of the present invention is to provide shuttle mechanism for progressing the film at constant speed throughout its movement whereby any cyclically changing tensile strains upon the film are avoided and to provide means for adjusting the machine to agree exactly with the film pitch and means for framing the picture when required.

The present invention comprises cinematograph projector mechanism in which the shuttle is adapted to periodically move a portion of the film lying between the pressure guide and the feed sprocket so that the upward motion of the shuttle exactly compensates for the downward progression of the film over the surface of the shuttle, the motion of the shuttle being rendered controllable so that its exact travel suits the pitch of the film and so that exactly the required portion of the film may be framed or caused to remain stabilized opposite an adjacently fixed aperture plate. Means are also provided whereby the picture is stabilized mechanically notwithstanding variation in the film pitch for maintaining a uniform tension on the film throughout the cycle of operations for the purpose of obviating eyestrain at the picture. The cam mechanism which actuates the shuttle is characterized by the use of a positive drive derived from a complementary pair of cams whose followers and their co-related parts are connected to a spring loaded closed-circuit for the purpose of eliminating back-lash.

My invention is illustrated by way of example in the accompanying drawings, in which—

Figure 5 shows a perspective view of the cam mechanism and transmission shaft operating the shuttle.

Figure 1:
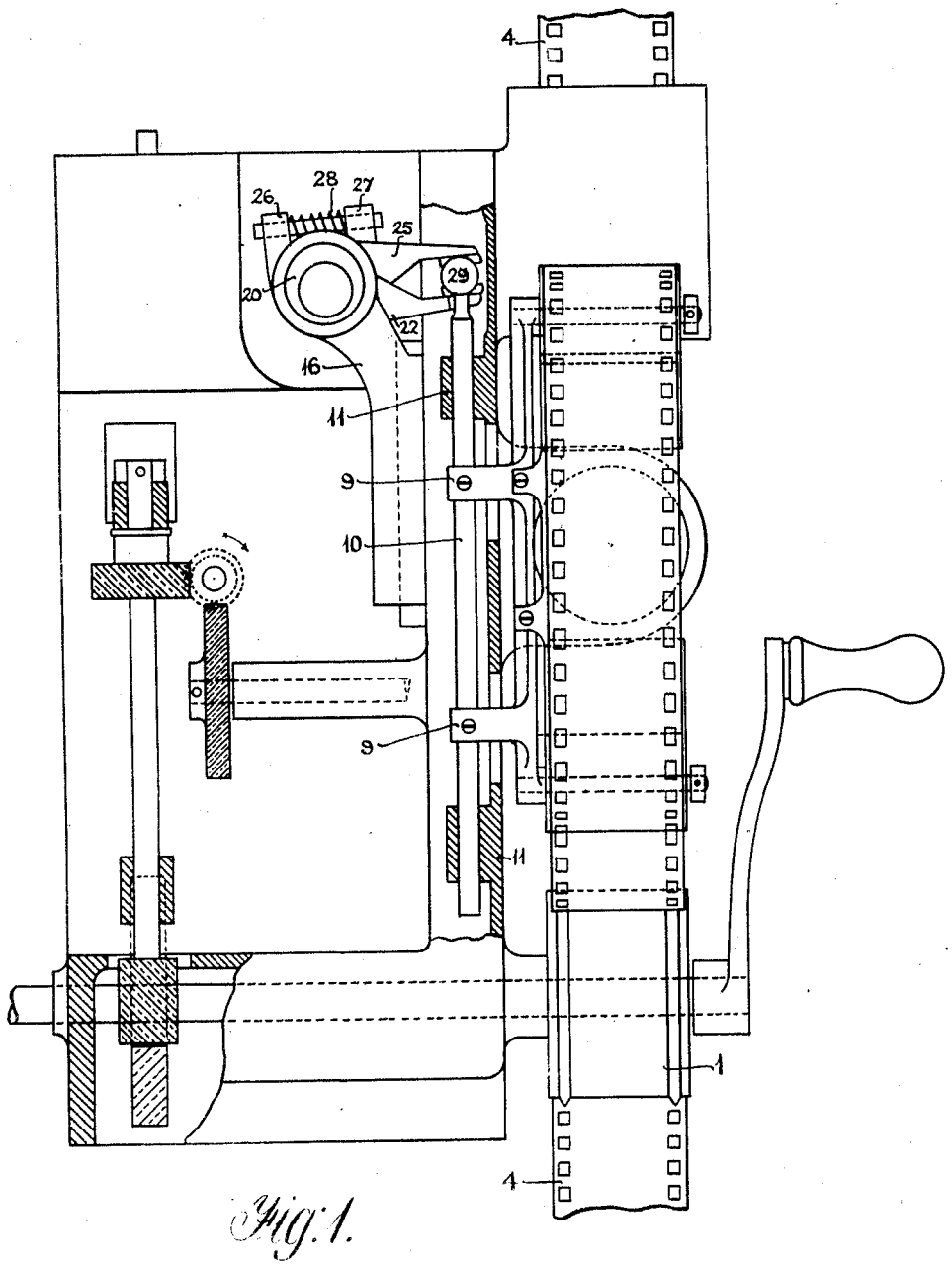
Figure 1 shows a front view partly in section.

Referring now to the drawings we provide below the optical axis a film feeding sprocket wheel 13 rotating at constant speed and above the optical axis a form of frame or gate through which the film is passed in the usual manner, having pressure bars 2 pressed by springs 3 against the margin of the film 4. The film 4 travels through this gate at a constant speed but undergoes an indirect path between it and the feeding sprocket 13, this path being controlled by a cyclically moving shuttle member actuated by the cams 6 (hereinafter more particularly described) on the shutter spindle 7. The said shuttle is comprised of a frame 5 carrying a pair of rollers 8 respectively mounted at each end of the shuttle frame 5 which frame is connected by brackets 9 more particularly shown in Figure 1 with a vertically movable rod 10 mounted in the bearings 11 and adapted to transmit to the shuttle the movement of a rocking arm (hereinafter described) actuated by cam mechanism. The path of the film is illustrated in Figure 2 in which the film 4 is shown passing through the pressure frame and from thence under the feeding roller 12 and across the shuttle rollers 8 carried by the shuttle frame and between a platen 40 mounted on the shuttle and the aperture plate 14 to the under roller 8 and then back to the film feeding roller 13 and finally to the bottom sprocket 1. At the optical axis the film lies lightly against the platen 40 which thus prevents lateral vibration. The aperture plate 14 serves to limit the light to just one picture; this aperture plate stands well clear of the film. Such a motion is imparted to the shuttle by the cam mechanism that its whole travel is approximately $$\frac{h}{2} \times \frac{1-p}{1}$$

where $h=$the longitudinal pitch of pictures on the film and $p=$the part of a whole cycle which is occupied by the return stroke of this member, this time being made conveniently less than the transit time of one shutter blade.

When the film 4 is in place and the machine set in position, the resulting action is such that during the time of projection of each picture, the film at the part where the optical axis crosses it (that is to say that portion of the film opposite the aperture plate 14 shown in dotted lines in Fig. 2) is maintained stationary relatively to the optical axis and thus at the screen, by the upward travel of the loop caused by the upward movement of the cyclically moving shuttle, and when said shuttle descends the next picture is substituted, the progression of the film being constant throughout the movement.

In order to provide for the possibility of a film being wrongly threaded or wrongly jointed, a framing slide is provided whereby it is possible to raise or lower one end of the rocking bar which communicates the motion from the cams to the shuttle thus varying the mean vertical position of the shuttle. This rocking bar 15 is mounted at one end in bearings 20 carried by the slide 16 which slide is connected by any suitable linkage such as a link 41 to a convenient handle such as a handle 42 (see Figures 2 and 4), whereby the operator can restore a complete picture to the screen if the latter has been wrongly threaded or wrongly jointed.

Figure 4:
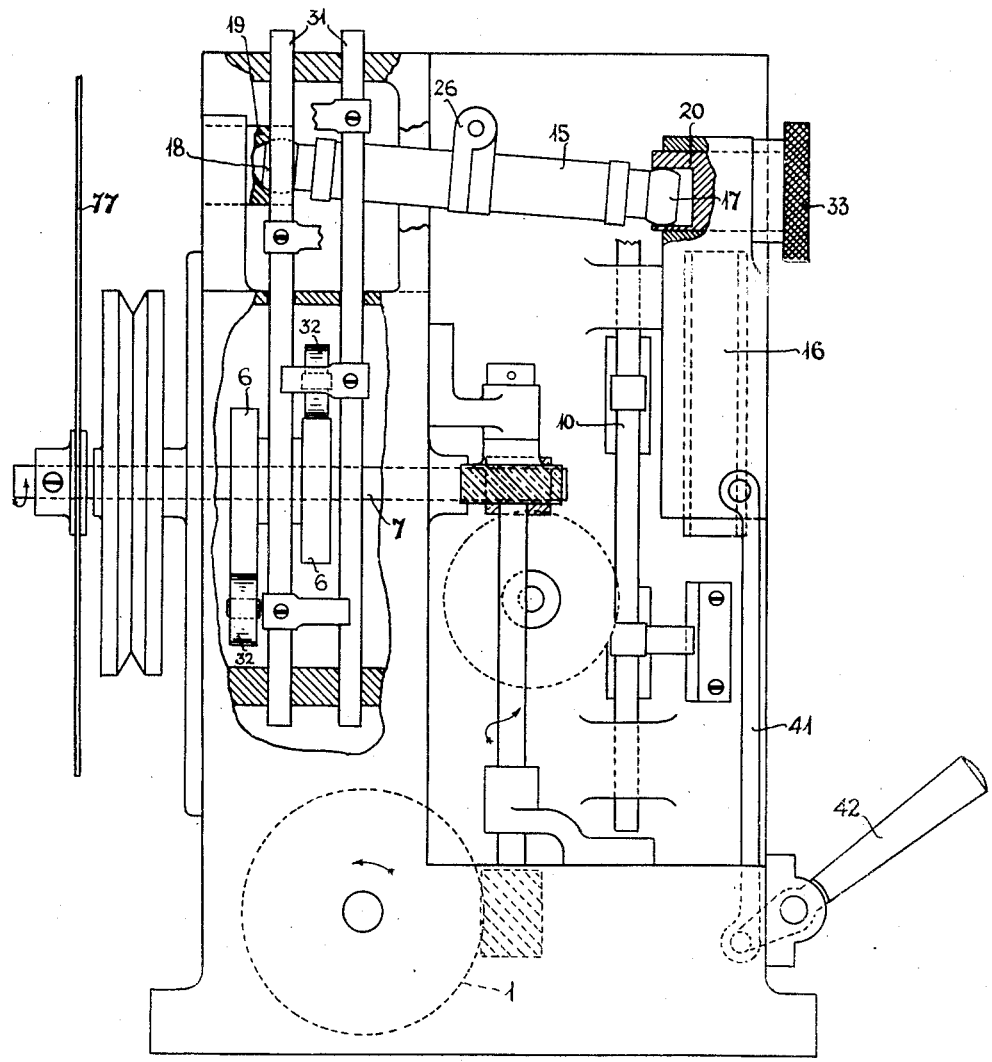
Figure 4 shows a side view on the left hand side of Figure 1.

The rocking bar 15 which communicates the motion from the cams 6 to the shuttle frame 5 is shown more particularly in Figure 5 of the accompanying drawings. As shown in Figure 4 this bar is provided at its ends with universal or ball joints 17, 18, the ball joint 18 being mounted in fixed bearings 19 and the ball 17 mounted in the above mentioned bearing 20 carried by the slide 16. This bearing is mounted eccentrically and can be rotated as will be hereinafter described. The said rocking bar 15 is comprised of an inner shaft 31 to which is attached the lower blades 22 of a pair of fork arms respectively arranged at the ends of said rocking bar. The inner shaft 21 is combined with a pair of outer sleeves 23, 24, which sleeves carry respectively the upper blades 25 of the said fork arms. These fork arms are respectively adapted to transmit from the cams 6 a rocking movement to the rocking bar and from said bar a reciprocating movement to the shuttle frame 5 through the connecting rod 10 and arms 9. The lugs 26, 27, respectively arranged on the sleeves 23, 24, of the rocking shaft are provided with abutments between which a spring 28 is arranged tending to hold the blades 25 in engagement with the ball joints 29, within said fork ends. These ball joints respectively connect the rocking arm with the cam mechanism and the shuttle mechanism and the pairs of blades 22—25 which respectively form the cam arm and the shuttle arm, are provided with spherically seated washers 30 as is customary in such constructions.

It will be readily understood that if the balls within the forks formed by said pairs of blades are solid, the effect of the spring 28 will be to take up backlash at both joints. In the preferred construction however, the ball 29 within the fork at the cam end of the shaft is divided as shown in Figure 5 and each part of this divided ball connects through the vertically sliding rods 21 with the follower rollers 32 of the cams 6, thus providing that the spring 28 also takes up the back-lash at the cams and their followers. The abutments on the sleeve lugs 26, 27, which support the spring 28, are designed to limit to what is a trivial amount the extent to which the spring can yield.

Figure 2:
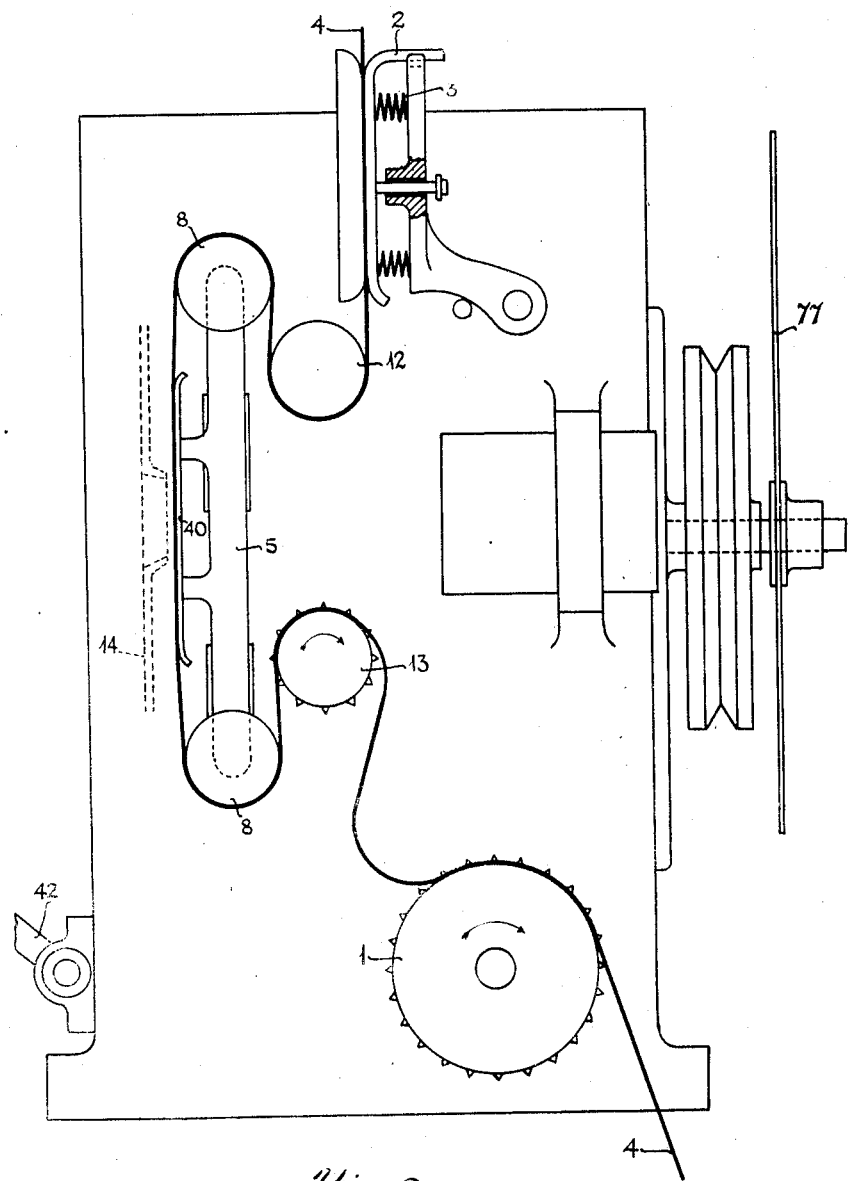
Figure 2 shows a side view on the right hand side of Figure 1 with the handle removed for the sake of clearness.
Figure 3:
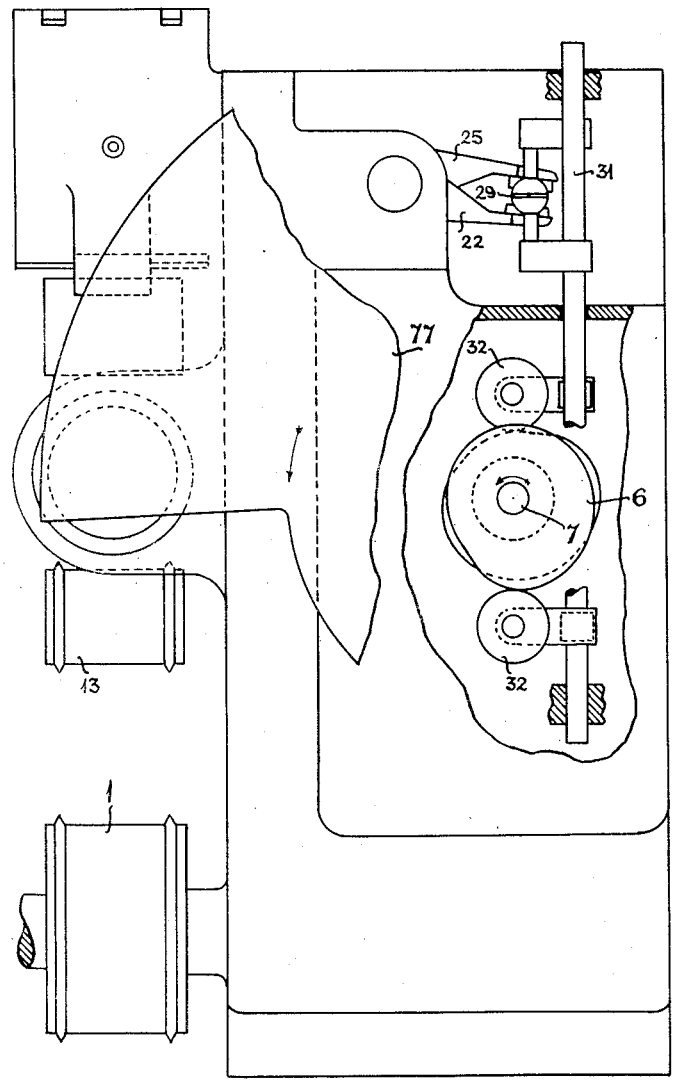
Figure 3 shows a rear view of Figure 1 with the shutter and casing partly broken away for the sake of clearness.

As shown in Figures 1 and 4 the framing slide 16 is mounted on a guide parallel to the shuttle guide bar 10 and the cam follower guides 31 and consequently the same character of motion is imparted by the cams 6 to the shuttle through the rocking shaft and shuttle guide bar 10 whether the said rocking shaft is in the horizontal plane or not. Further the amplitude of the shuttle motion is not varied by moving the framing slide 16 to raise or lower the end 17 of the rocking shaft 15. In order that the exact amplitude of the shuttle may be controlled so as to suit the film pitch, the universal ball joint 17 at the shuttle end of the rocking shaft 15 is mounted in a frictionally held eccentric bush 20 mentioned above, which bush is adapted to be turned to the desired position by the knurled head 33 to vary the position of the rocking shaft and consequently to vary the effective length of the fork arm at the shuttle end of the rocking shaft and thus of the length of the reciprocating motion transmitted to the shuttle.

What I claim is:—

1. Cinematograph mechanism of the continuously moving film kind comprising a framework, a film guide mounted in said framework above the optical axis of projection, a film feed mounted in said framework below the optical axis, a reciprocating member adapted to move that portion of the film lying between said guide and said feed so that the upward motion of the member exactly compensates for the downward progression of the film over the surface of said member and that part of the film where the optical axis crosses it is maintained stationary relatively to said optical axis, means for actuating said member and means for controlling the motion of said member to allow of adjustment of its travel to agree with the pitch of the film.

2. Cinematograph mechanism of the continuously moving film kind comprising a framework, a film pressure guide mounted in said framework above the optical axis of projection, a film feed sprocket mounted in said framework below the optical axis and adapted to move the film continuously through said film pressure guide, a vertically reciprocating shuttle mounted in said framework and adapted to move that portion of the film lying between said pressure guide and said feed sprocket so that the upward motion of the shuttle exactly compensates for the downward progression of the film over the surface of the shuttle and that part of the film where the optical axis crosses it is maintained stationary relatively to said optical axis, means for actuating said shuttle and means for controlling the motion of said shuttle to allow of adjustment of its travel to agree with the pitch of the film.

3. Cinematograph mechanism of the continuously moving film kind comprising a framework, an aperture plate mounted in said framework in the optical axis of projection, a film pressure guide mounted in said framework above the optical axis of projection, a film feed sprocket mounted in said framework below the optical axis and adapted to move the film continuously through said film pressure guide, a vertically reciprocating shuttle mounted in said framework and adapted to move that portion of the film lying between said pressure guide and said feed sprocket so that the upward motion of the shuttle exactly compensates for the downward progression of the film over the surface of the shuttle and that portion of the film where the optical axis crosses it is maintained stationary relatively to said optical axis, means for actuating said shuttle and means for controlling the motion of said shuttle to allow of the required portion of the film being stabilized in the optical axis of projection opposite said fixed aperture plate.

4. Cinematograph mechanism of the continuously moving film kind comprising a framework, a film pressure guide mounted in said framework above the optical axis of projection, a film feed sprocket mounted in said framework below the optical axis and adapted to move the film continuously through said film pressure guide, a vertically reciprocating shuttle mounted in said framework and adapted to move that portion of the film lying between said pressure guide and said feed sprocket so that the upward motion of the shuttle exactly compensates for the downward progression of the film from the surface of the shuttle and that part of the film where the optical axis crosses it is maintained stationary relatively to said optical axis, cam mechanism for actuating said shuttle and means for controlling the motion of said shuttle to allow of adjustment of its travel to agree with the pitch of the film.

5. Cinematograph mechanism of the continuously moving film kind comprising a framework, a film gate mounted in said framework above the optical axis of projection, spring controlled pressure bars adapted to engage the margin of the film passing through said gate, a film feed sprocket mounted in said framework below the optical axis and adapted to move the film continuously through said pressure gate, a vertically reciprocating frame mounted in said framework and adapted to move that portion of the film lying between said pressure gate and said feed sprocket so that the upward motion of the frame exactly compensates for the downward progression of the film over the surface of the frame and that part of the film where the optical axis crosses it is maintained stationary relatively to said optical axis, a pair of rollers mounted at each end of said frame adapted to receive said moving film, a rocking bar adapted to reciprocate said frame, cam mechanism adapted to actuate said rocking bar and means for controlling the motion of said frame to allow of adjustment of its travel to agree with the pitch of the film.

6. Cinematograph mechanism of the continuously moving film kind comprising a framework, a film gate mounted in said framework above the optical axis of projection, spring controlled pressure bars adapted to engage the margin of the film passing through said gate, a film feed sprocket mounted in said framework below the optical axis and adapted to move the film continuously through said pressure gate, a vertically reciprocating frame mounted in said framework and adapted to move that portion of the film lying between said pressure gate and said feed sprocket so that the upward motion of the frame exactly compensates for the downward progression of the film over the surface of the frame and that part of the film where the optical axis crosses it is maintained stationary relatively to said optical axis, a pair of rollers mounted at each end of said frame adapted to carry said moving film, a rocking bar adapted to reciprocate said frame, a slide supporting in bearings one end of said rocking bar, means for moving said slide to raise or lower said rocking bar to adjust the mean vertical position of the frame to the desired framing position, cam mechanism adapted to actuate said rocking bar and means for controlling the motion of said frame to allow of adjustment of its travel to agree with the pitch of the film.

7. Cinematograph mechanism of the continuously moving film kind comprising a framework, a film gate mounted in said framework above the optical axis of projection, spring controlled pressure bars adapted to engage the margin of the film passing through said gate, a film feed sprocket mounted in said framework below the optical axis and adapted to move the film continuously through said pressure gate, a vertically reciprocating frame mounted in said framework and adapted to move that portion of the film lying between said pressure gate and said feed sprocket so that the upward motion of the frame exactly compensates for the downward progression of the film over the surface of the frame and that part of the film where the optical axis crosses it is maintained stationary relatively to said optical axis, a pair of rollers mounted at each end of said frame adapted to carry said moving film, a rocking bar adapted to reciprocate said frame, cam mechanism adapted to rock said bar, ball joints mounted at the ends of said bar, bearings supporting one end of said bar rigidly mounted in said framework, a slide supporting in bearings the other end of said bar, crank arms rigidly mounted at the ends of said bar, a pair of sleeves mounted on said bar, spring means connecting said sleeves adapted to absorb the backlash in the connecting mechanism between the rocking bar and the cam mechanism, crank arms mounted on said sleeves adapted to register with the crank arms on said bar, ball joints in said crank arms, arms attached to said ball joints respectively adapted to connect said pairs of crank arms with said frame and with said cam mechanism, means for moving said slide to raise or lower said rocking bar to adjust the mean vertical position of the frame to the desired framing position and means for controlling the motion of said frame to allow of adjustment of its travel to agree with the pitch of the film.

8. Cinematograph mechanism of the continuously moving film kind comprising a framework, a film gate mounted in said framework above the optical axis of projection, spring controlled pressure bars adapted to engage the margin of the film passing through said gate, a film feed sprocket mounted in said framework below the optical axis and adapted to move the film continuously through said pressure gate, a vertically reciprocating frame mounted in said framework and adapted to move that portion of the film lying between said pressure gate and said feed sprocket so that the upward motion of the frame exactly compensates for the downward progression of the film over the surface of the frame and that part of the film where the optical axis crosses it is maintained stationary relatively to said optical axis, a pair of rollers mounted at each end of said frame adapted to carry said moving film, a rocking bar adapted to reciprocate said frame, cam mechanism adapted to rock said bar, ball joints mounted at the ends of said bar, bearings supporting one end of said bar rigidly mounted in said framework, a slide supporting in bearings the other end of said bar, crank arms rigidly mounted at the ends of said bar, a pair of sleeves mounted on said bar, crank arms mounted on said sleeves adapted to register with the crank arms on said bar, ball joints respectively adapted to connect said pairs of crank arms with said frame and with said cam mechanism, means for moving said framing slide to raise or lower said rocking bar to adjust the mean vertical position of the shuttle frame to the desired framing position, lugs mounted on the adjacent ends of said bar sleeves, a spring mounted between said lugs tending to hold the jaws formed by said pairs of crank arms in engagement with the ball joints of the arms respectively connecting the rocking bar with the cam mechanism and the shuttle frame and means for controlling the motion of said frame to allow of adjustment of its travel to agree with the pitch of the film.

9. Cinematograph mechanism of the continuously moving film kind comprising a framework, a film pressure guide mounted in said framework above the optical axis of projection, a film feed sprocket mounted in said framework below the optical axis and adapted to move the film continuously through said film pressure guide, a vertically reciprocating shuttle mounted in said framework and adapted to move that portion of the film lying between said pressure guide and said feed sprocket so that the upward motion of the shuttle exactly compensates for the downward progression of the film over the surface of the shuttle and that part of the film where the optical axis crosses it is maintained stationary relatively to said optical axis, a rocking bar adapted to reciprocate said shuttle, a pair of complementary cams adapted to actuate said rocking bar, ball joints mounted at the ends of said bar, bearings supporting one end of said bar rigidly mounted in said framework, a slide supporting in bearings the other end of said bar, crank arms rigidly mounted at the ends of said bar, a pair of sleeves mounted on said bar, crank arms mounted on said sleeves adapted to register with the crank arms on said bar, a ball joint within the crank arms at one end of said bar adapted to connect it with said shuttle, a divided ball joint within the crank arms at the other end of said bar, vertically sliding rods respectively carried by said ball parts, follower rollers at the free extremities of said sliding rods respectively adapted to engage said complementary cams, means for moving said framing slide to raise or lower said rocking bar to adjust the mean vertical position of the shuttle to the desired framing position, lugs mounted on the adjacent ends of said bar sleeves, a spring mounted on said lugs tending to hold the jaws formed by said pairs of crank arms in engagement with the ball joints of the arms respectively connecting the said rocking bar with the cam mechanism and the shuttle frame and means for controlling the motion of said frame to allow of adjustment of its travel to agree with the pitch of the film.

10. Cinematograph mechanism of the continuously moving film kind comprising a framework, a film pressure guide mounted in said framework, above the optical axis of projection, a film feed sprocket mounted in said framework below the optical axis and adapted to move the film continuously through said film pressure guide, a vertically reciprocating shuttle mounted in said framework and adapted to move that portion of the film lying between said pressure guide and said feed sprocket so that the upward motion of the shuttle exactly compensates for the downward progression of the film over the surface of the shuttle and that part of the film where the optical axis crosses it is maintained stationary relatively to said optical axis, a rocking bar adapted to actuate said shuttle, cam mechanism adapted to rock said rocking bar, a slide supporting in a rotatable eccentric bush, one end of said rocking bar, means for moving said slide to raise or lower said rocking bar to adjust the mean vertical position of the shuttle to the desired framing position, means for turning said eccentric bush to vary the position of said rocking bar and consequently the length of the reciprocating motion transmitted to the shuttle.

In testimony whereof I have signed my name to this specification.

G. B. BOWELL.